Patented May 24, 1938

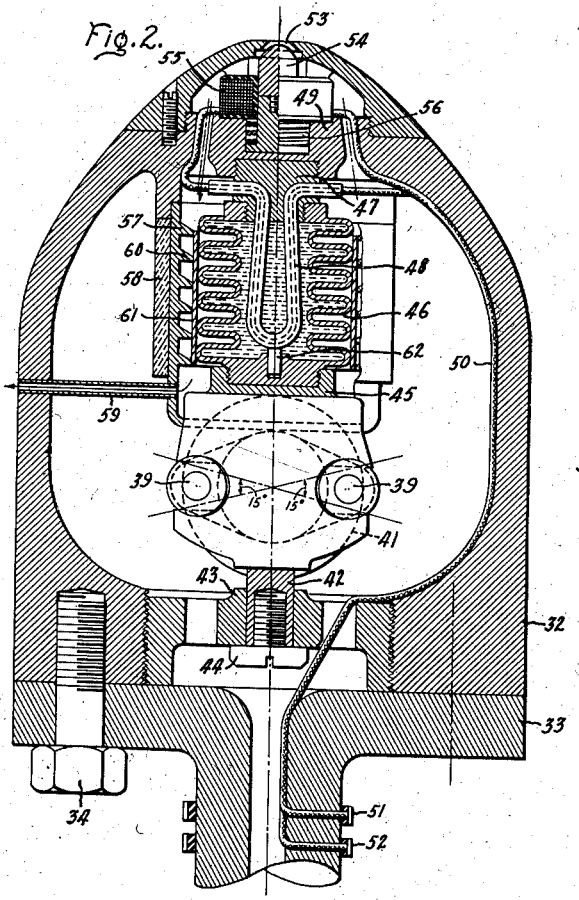

2,118,653

UNITED STATES PATENT OFFICE 2,118,653

CONTROLLABLE PITCH PROPELLER

Nicolaas E. Groeneveld Meijer, Schenectady, N. Y., assignor to General Electric Company, a corporation of New York Application June 14, 1935, Serial No. 26,604
In Germany August 23, 1934

15 Claims. (Cl. 170—163)

This invention relates to controllable pitch propellers, more particularly to aircraft propellers, and it has for an object the provision of a simple, reliable and improved propeller of this character.

The present invention is an improvement of the controllable pitch propeller disclosed in application Serial No. 27,413—Controllable pitch propeller—filed June 19, 1935, and assigned to the same assignee. The pitch changing mechanism of the propeller disclosed in the former application comprises an adjusting element heated by a supply of thermal energy. The resultant deformation of this element is utilized to adjust the pitch of the blades. In order to limit the size and weight of the source of thermal supply to a minimum, this adjusting element is arranged within the closed propeller hub.

As an improvement of such an adjusting device, the invention provides means for supplying a cooling medium to cool the adjusting element. After disconnection of the heat supply, the adjusting element can in this manner be cooled more rapidly, and the reverse adjusting motion thereby accelerated.

It is advisable to control the cooling arrangement automatically as a function of the heat supply, so that a special switching operation to effect the cooling is not required.

In carrying the invention into effect in one form thereof, the cooling means comprises one or more valves, through which a natural or forced cooling air current is led to the heated adjusting element. If the adjusting element is heated by a supply of electric power, then the control of the air valves is preferably carried out by means of electro-magnets which are connected to be controlled by or in accordance with an operating condition of the electric heating line circuit.

In illustrating one form of the invention, it is shown as embodied in an aircraft propeller in which electric heating means are provided for actuating the pitch adjusting element.

For a better and more complete understanding of the invention, reference should now be had to the following specification and to the accompanying drawing in which Fig. 1 is a sectional view through the propeller hub perpendicular to the longitudinal axis of the propeller blades. Fig. 2 is a sectional view, perpendicular to the blade axis of a modification; Fig. 3 is a view partly in section of the modification of Fig. 2 taken parallel to the blade axis; and Fig. 4 is a detail of the modification of Fig. 2.

Referring now to the drawing, a propeller hub 10 is secured by suitable fastening means such as bolts (not shown) to the flange 11 of the motor shaft 12. The propeller hub comprises a hollow housing member which on the inside is provided to advantage with a thermal insulating layer 13 in order to minimize any heat radiation to the outside. In this hub, the propeller blades (not shown) are rotatably mounted in bearings to provide for rotation about their longitudinal axes. Each blade is provided at its root end with a control disc 14. For the purpose of rotating the blades about their longitudinal axes to adjust the pitch thereof, a plurality of U-shaped bimetallic adjusting elements 15, 16, 17, 18, 19 and 20 are provided. One end of each of these elements is positively fastened to the hub by suitable fastening means, such as the fastening means 21 for the element 15. The other ends of the adjusting elments 15, 17, and 19 are fastened by suitable means, indicated as adjusting pins or bolts 22, to the control disc 14 for one of the blades, and the other ends of the adjusting elements 16, 18 and 20 are similarly connected to the control disc (not shown) of the opposite blade. The bimetallic elements are provided with heating windings such as the winding 22' surrounding the bimetallic element 15. These heating windings are connected to slip rings 23 which in turn are connected through a switching device, to a suitable source of electric power supply.

When the connections between the heating windings and the source are completed the bimetallic elements are heated. This causes these elements to deform, as a result of which large forces are developed which rotate the propeller blades about their longitudinal axes to vary their pitch from the normal or most frequently used setting, to any desired setting.

In order to return the blades to their normal or usual pitch setting, suitable cooling means are provided for rapidly cooling the adjusting elements. As shown, a plurality of orifices 24, 25 are provided in the shell of the hub for admitting air to the interior of the hub. These orifices are on the front side of the hub facing in the direction of travel of the airplane. Orifices 26, 27 are provided in the rear wall of the hub to provide for exhausting the cooling air and thus providing forced circulation of a continuous stream of cooling air.

The cooling air inlet orifices 24, 25 are controlled by means of valves 28, 29. These valves are normally maintained open during flight by means of air pressure resulting from the velocity of the airplane. However, if desired, suitable spring means may be utilized to augment the force developed by air pressure. These valves are controlled by means of the solenoids 30 and 31 which are preferably connected in the circuit of the electric heating line. If the electric power supply is disconnected, then the electric magnets 30 and 31 are simultaneously deenergized and the valves 28 and 29 are opened, so that a current of cooling air passes through the openings 24 and 25, which current will cool the heated adjusting elements. This causes the bimetallic elements to contract to their normal positions and to develop forces which return the blades to their normal pitch settings.

In the modification illustrated in Figs. 2, 3 and 4, a special housing is provided within the propeller hub, which encloses the thermal-adjusting element with a narrow gap. This special housing is made of a heat insulating material or is enclosed in heat insulating material. If the cooling is carried out by means of a cold air current, controlled by valves, then this air current is preferably led through the narrow gap between the special housing and the thermal-adjustment element. In this manner, a comparatively small cold air current is sufficient and a rapid cooling action is obtained.

In order to improve the cooling effect still further, the interior wall of the housing is provided with special deflecting surfaces which direct the cold air current in the direction of the thermal-adjustment element. When a bellows diaphragm is used as the thermal-adjusting element, these deflecting surfaces are preferably formed by annular extensions, beveled to direct the air current into the concavities of the bellows diaphragm.

As shown in Figs. 2 and 3, the propeller hub 32 is secured to the flange 33 of the motor shaft by suitable fastening means indicated as bolts 34. In the wall of the hub 32, bronze bearings 35 are provided, in which the blade shafts 36 are journaled for rotation about their longitudinal axes. The blade shafts 36 are provided with shoulders 37 and roller bearings 38 arranged between the interior ends of the bronze sleeve bearings 35 and shoulders 37 take the centrifugal thrust of the blades. At the root end of each of the blade shafts 36, an adjusting bolt 39 is provided which, as shown in Fig. 4, is eccentric with respect to the center of the blade shaft. On this adjusting bolt 39, a small sleeve bearing 40 is provided, which is fitted in a hole of an adjusting element or yoke 41 as indicated in Figs. 2 and 3.

The adjusting element 41 is mounted so that it can be moved axially, that is, in the direction of the motor shaft. The adjusting bolts 39 for the respective blades are located diametrically opposite to each other, so that the blades are rotated oppositely in response to a displacement of the yoke 41. For example, if the yoke is displaced toward the flange 33, the left hand bolt and the blade to which it is secured are given a counterclockwise rotation whereas the right bolt and the blade to which it is secured are given a clockwise rotation. The adjusting element 41 terminates at the extremity nearest the flange 33 in a sleeve element 42, which slides in part 43 of the propeller hub. A screw 44 provided in the sliding element 42 limits the axial displacement in the direction away from the flange 33. The opposite end of the sliding element 42 is provided with a threaded sleeve 45 into which one end of the bellows diaphragm 46 is screwed.

The diaphragm 46 is made of steel or any other suitable elastic material. The other end of the bellows diaphragm 46 is rigidly connected with a steel plug member 47 through which, an electric heating element 48 is introduced in the inside of the bellows diaphragm 46, which is filled with a suitable liquid. The plug member is preferably threaded and screwed into a supporting member 49 which is preferably formed integrally with the hub. This heating element 48 is supplied with the electric heating current from a suitable source (not shown) through the conductors 50, which are connected to slip rings 51, 52 on the motor shaft.

If it is desired to reduce to a minimum the time required for changing the pitch through a given angle, this can be accomplished by making the bellows diaphragm of a material having a low coefficient of expansion and sufficient strength such as an alloy of invar steel containing approximately 36 percent nickel, and utilizing a liquid having a high coefficient of thermal expansion, low specific weight and low thermal capacity such as ether or brombenzol.

In order to restore the bellows diaphragm 46 to its initial or normal position after interruption of the heat supply, a valve opening 53 is provided in the nose end of the propeller hub through which a natural flow of cold air is supplied to the inside of the propeller hub during flight. This valve opening can be closed off by means of a valve body 54 which is actuated by suitable means illustrated as a solenoid 55. During flight the valve is held open by air pressure, or if desired a spring 56 may be utilized for this purpose. The solenoid 55 is preferably connected in circuit with the heating element 48 so that it is energized when the heating element is energized and consequently maintains the valve 54 seated and the valve opening closed. If the heating current is interrupted, then the valve body 54 is forced open by air pressure and action of the spring 56, so that the valve opening is uncovered to admit a current of cold air to the interior of the hub. The cold air current can, in this manner, be led to the inside of the housing 57 which fits closely around the bellows diaphragm 46 and either is made of insulating material or is enclosed in an insulator 58. The cold air flow is exhausted from the housing and hub by means of a small pipe 59.

In order to improve the cooling action, the inside wall of the housing 58 is provided with annular extensions 60. The faces of these annular extensions nearest the nose of the hub are beveled so that the cold air current is deflected into the concavities of the bellows diaphragm 46. In this manner, cooling air will flow on all sides around the bellows diaphragm, so that a rapid cooling of the diaphragm is made possible. For the purpose of preventing the diaphragm from bending in response to the tremendous forces developed, a plurality of guide rails 61 are welded or otherwise suitably secured to the housing member 57.

The heating element is preferably of the type on the market under the trade name Calrod. This element can be made stiff enough to prevent bending on account of centrifugal forces. However, if desired a central guide 62 may be utilized to keep it centered with respect to the axis of the hub.

The spring effect of the bellows 46 can be utilized to cause the pitch changing yoke to follow the bellows when the heat supply is interrupted.

Although in accordance with the provisions of the patent statutes, this invention is shown and described in the best form in which it is now contemplated carrying the invention into effect, it will be understood that the elements and their arrangement are merely illustrative and that the invention is not limited thereto since alterations and modifications will readily suggest themselves to persons skilled in the art without departing from the spirit of this invention, or from the scope of the annexed claims.

What I claim as new and desire to secure by Letters Patent of the United States is:

1. A controllable pitch propeller for aircraft and the like comprising a hub member, a plurality of blades rotatably mounted thereon, thermal responsive means enclosed within said hub and connected to said hub and to said blades for adjusting the pitch of the blades, means for controlling the supply of thermal energy to said thermal responsive means, and means for controlling the cooling of said thermal responsive means.

2. In a controllable pitch propeller for aircraft and the like, the combination comprising a rotatable hub, a plurality of blades rotatably mounted thereon, means for supplying thermal energy to the interior of said hub, a thermal responsive element enclosed within said hub and connected to said hub and said blades for adjusting the pitch of the propeller blades, and means for circulating a cooling medium to the space in the interior of said hub to cool said element and restore the normal pitch setting of said blades.

3. A controllable pitch propeller for aircraft and the like comprising a rotatable hub, a plurality of blades mounted on said hub for rotation about the longitudinal axes of said blades, means for supplying thermal energy to the interior of said hub, a thermal responsive element enclosed within said hub for adjusting the pitch of said blades, and valve means for controlling the supply of air to the interior of said hub to cool said element and restore the normal pitch setting of said blades.

4. Pitch adjusting means for a controllable pitch propeller for aircraft and the like having a rotatable hub member and a plurality of blades mounted thereon for rotation about their longitudinal axes comprising means for supplying thermal energy to the interior of said hub, thermal responsive means enclosed in said hub and means connecting said thermal responsive means to said hub and to said blades to produce a force for rotating said blades about said axes to adjust the pitch thereof, and electrically controlled valve means in said hub for controlling the supply of air to the interior of said hub for cooling said thermal responsive means to effect return of said blades to normal pitch.

5. A controllable pitch propeller comprising a hub member having a plurality of blades mounted thereon for rotation about their longitudinal axes, a thermal energy responsive element enclosed in said hub and means for connecting said element to said hub and to said blades to provide for adjusting the pitch of said blades, valve means normally biased to the open position for admitting a supply of air to cool said element to maintain said blades in normal pitch position, electrical means for heating and deforming said element to cause said element to adjust the pitch of said blades and electrically operated means for closing said valve means to shut off the supply of cooling air when said heating means is energized.

6. A controllable pitch propeller comprising a hub member having a plurality of blades mounted thereon for rotation about their longitudinal axes, a heat responsive element enclosed in said hub and means connecting said heat responsive element to said hub and to said blades for adjusting the pitch of said blades, valve means for controlling the supply of cooling air to said hub, means normally biasing said valve means to open position to admit a supply of air to cool said element and maintain said blades in normal pitch position, means for supplying electric energy to the interior of said hub to heat said element, and solenoid means energized when said heating means is energized to operate said valve means to closed position to interrupt the supply of cooling air.

7. A controllable pitch propeller comprising a rotatable hub provided with a housing member, a plurality of blades rotatably mounted on said hub, means for supplying thermal energy to the space within said housing member, means for adjusting the pitch of said propeller blades comprising an element mounted within said housing member responsive to thermal energy and means for connecting said element to said hub and to said blades thereby to produce a force for adjusting the pitch of said blades, and means for circulating a cooling medium through the space within said housing member to provide rapid cooling of said element and restoration of said blades to their normal pitch positions.

8. A controllable pitch propeller for aircraft and the like comprising a hollow hub member, a plurality of blades rotatably mounted on said hub, means for supplying thermal energy to the interior of said hub, thermal energy responsive device enclosed within said hub and means for connecting said device to said hub and to said blades to provide for adjusting the pitch thereof, means for controlling the supply of a cooling medium to the space within said hub member and for circulating said medium through said space, and an insulated housing member within said hub surrounding said thermal energy responsive element to prevent loss of heat through said hub.

9. A controllable pitch propeller comprising a rotatably mounted hollow hub member, a thermal energy responsive element enclosed within said hub and connected to the propeller blades and said hub, means for supplying thermal energy to the interior of said hub thereby to deform said element and produce a force for changing the pitch of said blades, means for admitting a cooling medium to the interior of said hub to cool said element and thereby restore the normal pitch setting of said blades, and an insulated housing member closely surrounding said adjusting element and for conducting said cooling medium into contact with said adjusting element thereby to increase the speed of said restoring action.

10. A controllable pitch propeller comprising a rotatably mounted hollow hub member having a plurality of propeller blades mounted thereon for rotation about the longitudinal axes of said blades, a thermal energy responsive device enclosed in said hub and connected to said hub and said blades, means for supplying thermal energy to heat said element and cause said element to deform and produce a force for adjusting the pitch of said blades, means for supplying a cooling medium to the interior of said hub to cool said element and restore said blades to normal pitch setting, and an insulated housing member surrounding said adjusting element to provide a restricted passageway for said cooling medium and provided with deflecting means for directing the cooling medium into contact with said element.

11. Pitch adjusting mechanism for an aircraft propeller and the like having a rotatably mounted hollow hub member and a plurality of blades mounted in said hub member for rotation about the longitudinal axes thereof, comprising a thermal energy responsive element enclosed within said hub and connected to said blades and to said hub, means for supplying thermal energy to cause said element to deform and produce a force for rotating said blades about said axes, means for supplying cooling air to cool said element to provide for restoring the normal pitch setting of said blades, and an insulated housing closely surrounding said element to provide a restricted passage for said air and provided on its inner surface with a plurality of deflecting surfaces for directing said air against said element.

12. Pitch adjusting mechanism for a propeller having a hollow hub member and a plurality of blades mounted in said hub for rotation about their longitudinal axes, comprising a bellows member containing an expansible fluid, said bellows member being enclosed within said hub and connected to said blades and said hub, means for supplying heat to said fluid to cause said fluid to expand and produce a force for rotating said blades about said axes, means for supplying air to cool said bellows to provide for restoring the normal pitch setting of said blades, and an insulated housing surrounding said bellows and providing a restricted passageway for said air and provided with a plurality of deflecting surfaces surrounding said bellows for positively directing the cooling air into the concavities of said bellows.

13. Pitch varying mechanism for a controllable pitch propeller having a hollow hub member and a plurality of blades mounted in said hub for rotation about their longitudinal axes comprising a bellows diaphragm containing an expansible elastic fluid, said bellows being enclosed in said hub and connected to said blades and said hub, means for heating said fluid to produce a force for rotating said blades to vary the pitch thereof, valve means for admitting air to the interior of said hub to cool said bellows to restore the pitch of said blades to normal, a housing member closely surrounding said bellows to provide a passageway for said air, and guide means arranged within said housing for preventing bending of said bellows in response to the force developed by heating said fluid.

14. Pitch changing mechanism for a controllable pitch propeller having a hollow hub member and a plurality of blades mounted therein for rotation about their longitudinal axes, a bellows diaphragm containing an expansible fluid enclosed in said hub and connected to said blades and to said hub, means for heating said fluid to produce a force for rotating said blades to vary the pitch thereof, valve means for admitting air to the interior of said hub to cool said fluid and rotate said blades in the opposite direction, an insulated housing member surrounding said bellows providing a passageway for positively directing said cooling air into contact with said bellows, and guide means for preventing said bellows from bending in response to the force developed by heating said fluid comprising a plurality of rails secured to the inner surface of said housing member.

15. In a controllable pitch propeller having a hollow hub member and a plurality of blades rotatably mounted in said hub member for rotation about the longitudinal axes thereof, a bellows diaphragm containing an expansible fluid mounted within said hub and connected to said blades and said hub, an electric heating element for heating said fluid so as to produce a force for rotating said blades to vary the pitch thereof, a valve mounted in the nose of said hub, solenoid means energized when said heating element is energized to close said valve, spring means for biasing said valve to the open position to admit air to said hub to cool said fluid and restore said blades to normal pitch setting, a housing member closely surrounding said diaphragm and providing a passageway communicating with said valve means for positively conducting air past said diaphragm, and a plurality of annular deflecting surfaces arranged on the inside surface of said housing for directing air into the concavities of said bellows.

NICOLAAS E. GROENEVELD MEIJER.